Figure 1:
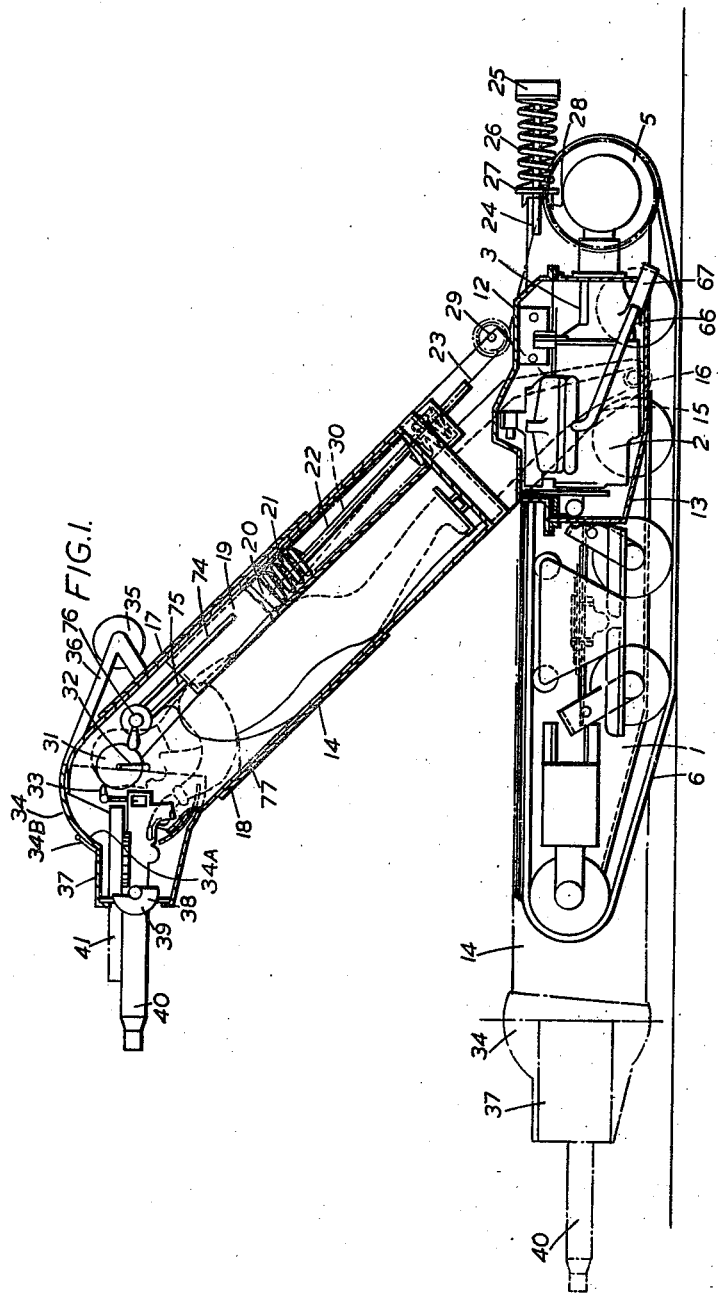

July 16, 1946.　　　　E. T. J. TAPP　　　2,404,256
MECHANICALLY PROPELLED VEHICLE
Filed Feb. 16, 1944　　　5 Sheets-Sheet 5

Ernest Thomas James Tapp Inventor

By
Cushman, Darby & Cushman
Attorney

Patented July 16, 1946

2,404,256

UNITED STATES PATENT OFFICE 2,404,256

MECHANICALLY PROPELLED VEHICLE

Ernest Thomas James Tapp, Fleet, England

Application February 16, 1944, Serial No. 522,640
In Great Britain August 4, 1937

10 Claims. (Cl. 89—36)

This invention relates to mechanized warfare, and it has for its principal object to enable a mechanically propelled armoured vehicle, for the transport of armed or other personnel, supplies, or ammunition, to be operated with greater concealment than is possible in the case of a normal military vehicle or a fighting tank, another object being to enable natural or artificial obstacles to be negotiated with greater facility by a mechanized fighting machine, and a further object being to enable the control of such a machine to be effected without impairing or handicapping the manipulation of a weapon by the occupant or occupants.

To this end the invention consists of a mechanically propelled armoured vehicle comprising a relatively shallow armoured compartment to accommodate one or more persons which is articulated to a carriage in respect to which said compartment is capable of being elevated bodily when required, either for the purpose of increasing the field of vision of the occupant or occupants, for obtaining fire direction, or to enable the vehicle to pass through water, as the case may be.

The aforesaid compartment, which is preferably normally horizontal or substantially so, may be mounted on a carriage of either the endless-track or the multi-wheeled type in respect to which the compartment may be elevated by being moved angularly upwards to any required position.

In order to secure the desired objects of the invention the overall dimensions of the relatively shallow articulated compartment are such as to accommodate the occupant or occupants in a prone or a crouching position, means being provided whereby the control of the vehicle can be effected wholly or mainly by the feet of an occupant; and further, the construction of the machine is preferably so designed that when movement is imparted to the armoured compartment the centre of gravity of the machine is displaced rearwardly, by which means the negotiation of obstacles is facilitated.

Additionally, the compartment may also be capable of angular or traversing movement about a vertical axis.

A swivelling cupola and machine gun turret is mounted at the forward end of the armoured compartment, and the power unit for the propulsion of the vehicle is disposed on the aforesaid carriage in rear of the armoured compartment.

Means are provided whereby the armoured compartment can be elevated by the occupant, and to facilitate such elevation the compartment is preferably counterbalanced, the swivelling cupola being similarly counterbalanced.

Preferably the floor of the armoured compartment is contoured to afford comfortable support for the occupant's body and to secure maximum ground clearance for the vehicle.

In order to protect the occupant or occupants from the effects of poison gas and to obviate the wearing of a gas mask, the compartment may be supplied with a continuous flow of clean air admitted by a pipe open at the rising end of the compartment and the air being forced through a large respirator either by means of the power unit, or by a separate electric motor, the flow being sufficient to maintain in the compartment a pressure slightly above that of the atmosphere by which means should the compartment be perforated entry of poison gas will not occur.

To retard the escape of the clean air from the armoured compartment any joints therein or between it and the cupola may be lined for example with flexible brushes or flaps which may be impregnated with anti-gas chemicals as an additional precaution against the entry of poison gas.

The power unit, which may also be armoured, is preferably suitably encased in order that it may not be detrimentally affected by the passage of the vehicle through water, and advantage may be taken of this casing to accommodate the cooling water for the engine cylinders instead of employing a radiator; induction for the power unit being provided for by means of a tube extending to, and opening to the atmosphere at, the forward or rising end of the armoured compartment.

Figure 2:
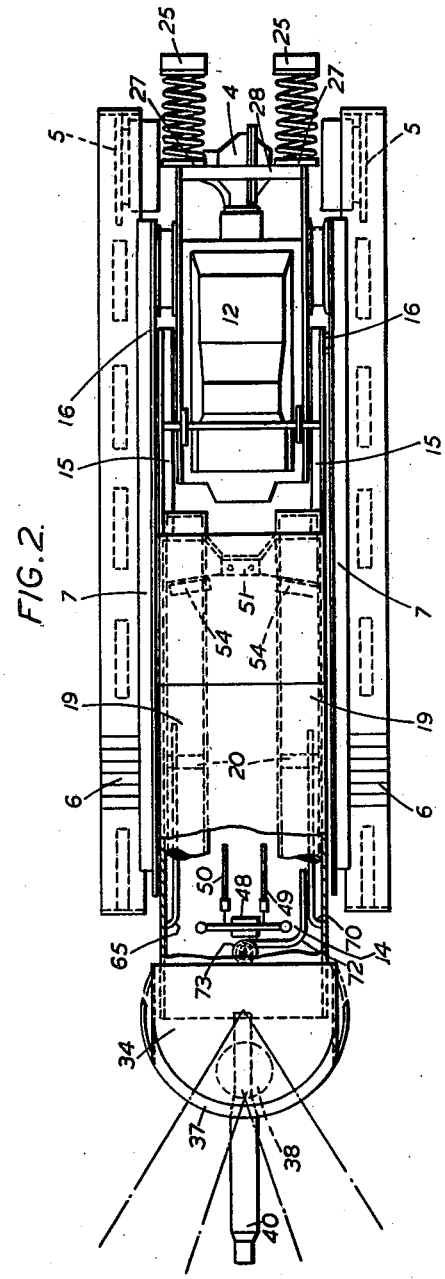

One constructional embodiment of the invention is illustrated, by way of example only, semi-diagrammatically, in the accompanying drawings, in which, Figure 1 is a longitudinal section showing the armoured compartment in a raised position in relation to its carriage, and Figure 2 is a plan view with the compartment lowered.

Figure 3:
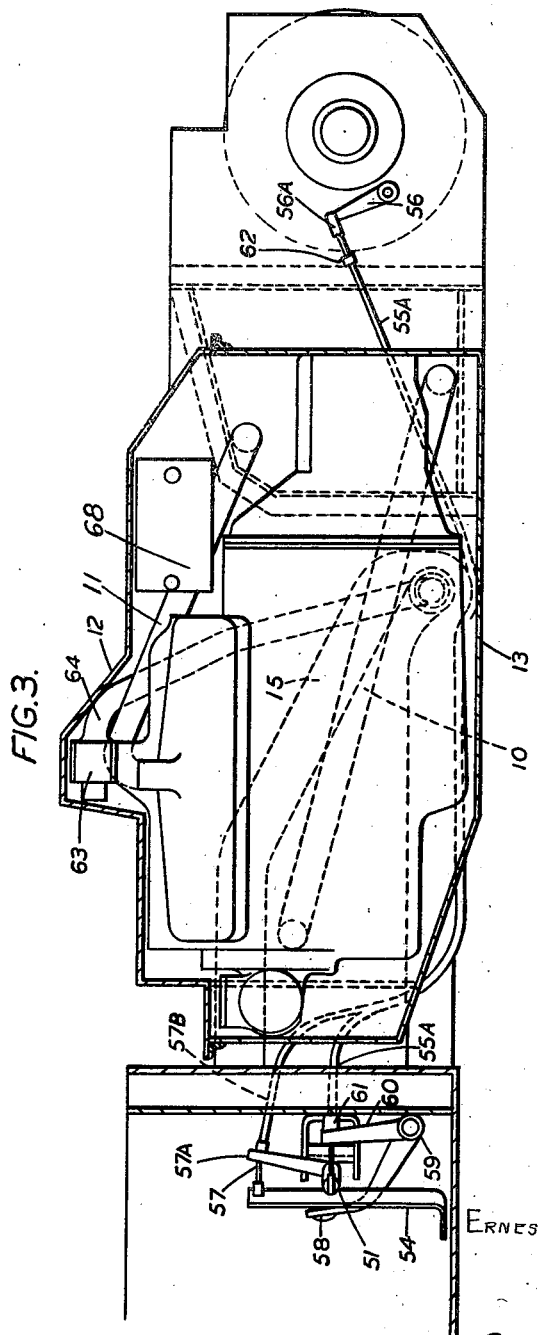
Figure 4:
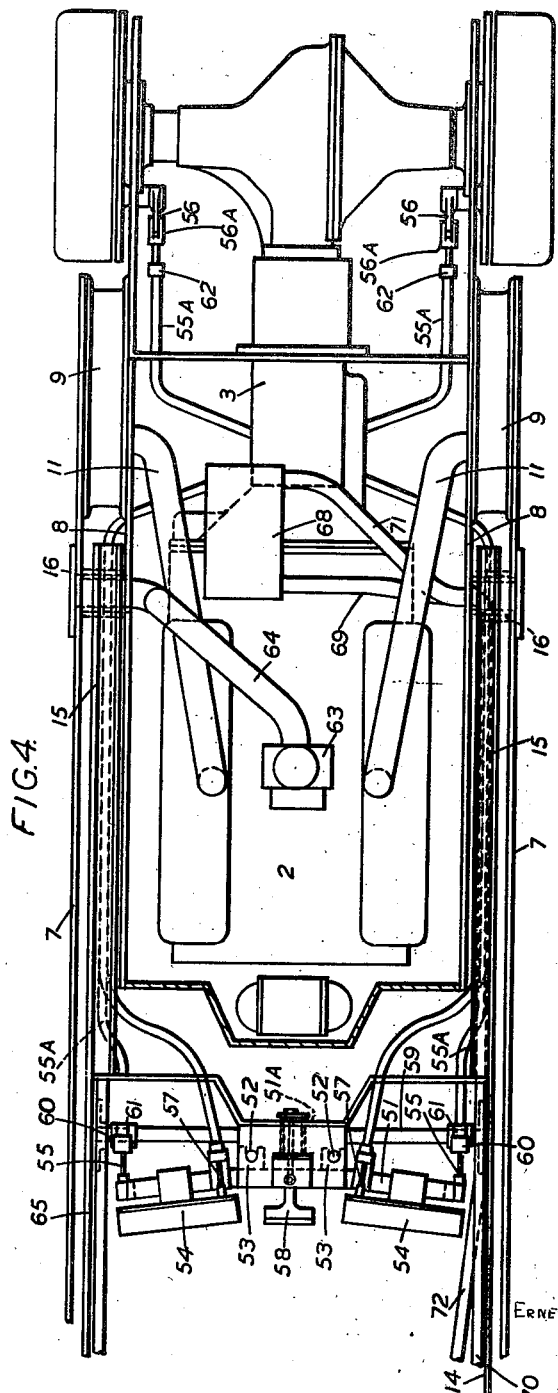

Figures 3 and 4, which are drawn to a larger scale, are, respectively, a longitudinal section and a plan view (with the engine housing cover removed) of the rear end of the vehicle (the endless track elements being omitted), both showing certain parts and connections which have been omitted, for the sake of clearness, from Figures 1 and 2.

Figure 5:
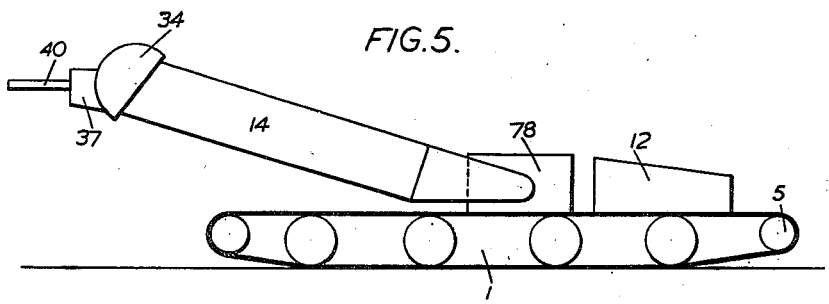
Figure 6:
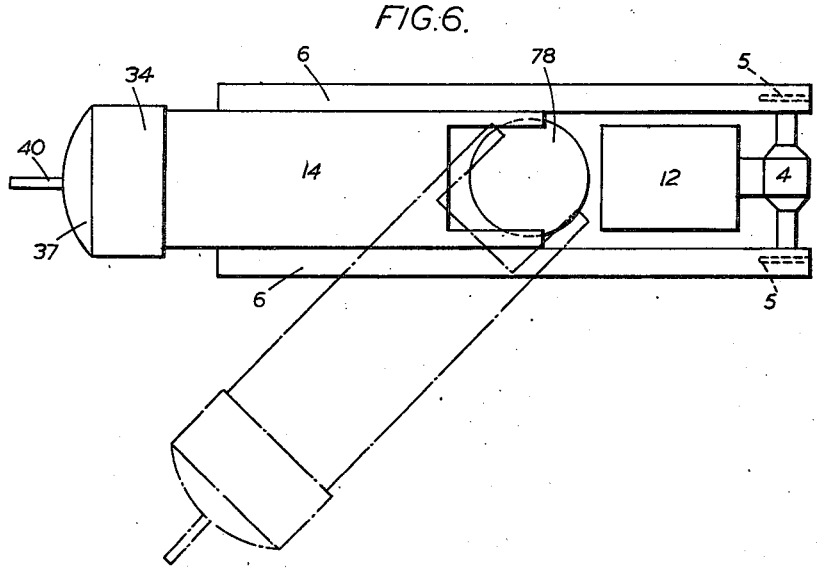

Figures 5 and 6 are, respectively, diagrammatic side and plan views of a modified form of vehicle in which the armoured compartment is capable of angular movement about a vertical axis in addition to angular movement about a horizontal axis.

It will be seen from these drawings that the mechanically propelled armoured vehicle of the kind in question comprises a carriage of the endless-track type consisting of two spaced and endless-track elements 1 between which, near the rear end thereof, is supported the power unit consisting of an internal combustion V-type engine 2 having a gear box 3 from which the power is transmitted to a differential axle in an axle casing 4, upon which axle the driving sprockets 5, 5, for the endless tracks 6, 6, are secured.

These endless track elements 1 include longitudinal frame members 7, 7, between the rearward ends of which are located subsidiary frame members 8, 8, connected solidly thereto by spacing chambers 9, 9, which serve as tanks for the circulating water for cooling the engine and communicate with the engine cylinder jackets by means of inlet pipes 10, 10, and outlet pipes 11, 11 (Figs. 3 and 4); the sub-frame members 8, 8, constituting the side walls of a substantially rectangular housing enclosing the engine, the remainder of which housing consists of a removable cover 12 and a fixed bottom plate or under-shield 13 which is either apertured or is smaller in area than the housing.

Between the aforesaid endless-track elements 1 there is arranged a rectangular armoured enclosed compartment 14 having rearwardly extending hollow limbs 15, 15, the extremities of which are mounted pivotally on trunnions 16, 16, secured to the main framing 7, 7, of the endless-track elements 1 and the sub-frames 8, 8; said compartment 14 being elevatable from the horizontal position between the track elements as shown by dot-and-dash lines in Figure 1, to a vertical position or intermediately thereof, and the depth of the compartment being sufficient to accommodate a man in the prone position, for which purpose it is suitably contoured internally.

Each of said trunnions 16, 16, is tubular and is also ported radially to communicate with connections to be referred to hereafter, and the compartment 14 is provided on its upper side with a movable entrance cover at 17, and on its lower side with a movable emergency exit cover at 18 (see Fig. 1).

Vacuum-servo means connectible with the engine induction manifold, are employed for the purpose of elevating the compartment 14, and these means comprise two cylinders 19, 19, each containing a piston 20 between the rear face of which and the bottom of each cylinder a compression spring 21 is confined, and each piston 20 is fitted with a piston rod 22 whereof the free end is connected, externally of each cylinder 19, by means of a chain 23 to a stem 24 carried by a cap 25 engaging a buffer spring 26 confined between it and a flange or stop 27 on the rear transverse member 28 of the vehicle frame, each chain 23 passing under a guide pulley 29 which is so located on the compartment 14 that the turning moment on the compartment exerted by the springs 21 as the compartment is elevated balances the moment due to the weight of the compartment throughout its movement.

In the event of it being necessary or desirable to elevate the compartment 14 when the engine is not running, a cable 30 extends from the stem 24 upwardly of the compartment 14 (suitably guided en route) to and around a winding drum 31 mounted rotatably at the head of the compartment 14 and provided with an operating handle 32 and a ratchet wheel (not shown) engaged by a pawl 33 pivoted on a bracket fixed within the compartment 14 whereby the compartment 14 may be raised manually by the occupant to any desired elevation, being assisted by the springs 21 the resistance of which nearly balances the compartment.

Instead of the above described vacuum-servo operation, fluid pressure may be utilized, in which case the cylinders 19, 19, in lieu of being connected with the engine induction, would be connected to a fluid pressure pump (not shown) located in the engine housing and driven by the engine 2, the strength of the springs 21 in the cylinders 19 being so adjusted as to be capable of overbalancing the compartment 14 in order to raise it.

On the forward or upper open end of the compartment 14, a cupola 34 is mounted so as to be capable of swivelling thereon and is counterbalanced by a weight 35 carried by a bracket 36 extending rearwardly from the cupola, and 37 is a traversing barbette or turret extending forwardly of and integral with the cupola 34 and accommodating a gimbal or other gun-mounting 38 protected by a hemi-spherical shield 39 in order to serve as a self-adjusting closure for the gun port.

Above the barbette the cupola is provided with a transverse aperture 34A closed by a flap 34B which is intended to be raised in order to afford the occupant clear vision when passing through safe areas.

Projecting through the port in the barbette or turret 37 is a machine gun 40 above which is a telescopic sighting or aiming tube 41 (forming no part of the invention) mounted slidably in the turret 37 to enable it to be moved forwardly when it is necessary to re-load the gun.

At the upper end of the compartment 14, in a position close to the occupant's arms, is a remote control, indicated in Figure 2 at 48, connected by a known type of pull-and-push flexible controls 49, 50, to, and operating in the known manner, the sliding members in the gear box 3, and, as shown in Figures 2, 3 and 4, below the feet of the occupant there is a transverse rocking bar 51 the two ends of which are set-up and which is held by means of a spring 51A on two pivot pins 52, 52, each engaged by an inverted U-shaped bearing pad 53 carried by bar 51, and, sleeved on or articulated to the rocking bar 51 are two pedals 54, 54, capable of being oscillated independently in a fore and aft direction on the bar 51.

Two bearings are provided for the rocking bar 51 in order to stabilize the occupant when the compartment is elevated and his weight is resting on the bar which is oscillated upon one or other of the bearings as the case may be when either pedal 54 is depressed.

The two ends of the bar 51 are connected, by means of flexible controls 55, 55, of the Bowden type, with the operating levers 56, 56, of brakeshoes acting on the driving sprockets 5, 5, of the endless tracks 6, 6, so that by rocking the bar 51 by the occupant applying pressure thereto with his feet the vehicle can be steered in the known manner by braking one or other of the tracks 6, 6. Similar flexible controls 57, 57, (each passing through a bracket 57A solid on bar 51 and serving as an abutment for the cable casing 57B) connect one pedal 54 with the throttle valve of the engine 2 and the other with the usual clutch between the engine 2 and the gear box 3; these latter controls being arranged so that they are operated only by the oscillation of the respective pedal 54 in relation to the rocking bar 51 and not when the latter bar is rocked bodily.

A third pedal 58 keyed to a transverse angularly movable shaft 59 and located intermediately of the pedals 54, 54, is provided for the purpose of braking the vehicle normally, and it functions through the medium of thrust levers 60, 60, also keyed to said shaft 59 and bearing at their free extremities on thimbles 61, 61, solid with the forward ends of the flexible tubular casings 55A, 55A, of the brake control cables 55, 55; the rearward ends of said casings 55A, 55A, being fixed to the framing at 62, 62, whereby on the application of pressure to the pedal 58, the brake shoes are applied simultaneously to the track driving sprockets 5, 5, as distinct from the independent operation through the cables 55, 55, of said brake levers 56, 56, by the oscillation of the rocking bar 51 for steering purposes.

The petrol supply for the engine 2 is contained in a petrol tank (not shown) located on the carriage in rear of the compartment 14, from which tank a supply pipe, in communication with a petrol filter and petrol pump, if necessary, is taken to the carburettor 63 disposed above the engine 2 and to which the air intake is effected by a pipe 64 connecting the carburettor with the offside trunnion 16 the port in which communicates with the interior of the adjacent hollow limb 15 into which is led an air-intake pipe 65 extending along the off-side of the compartment 14 and debouching at the forward end thereof (see Figs. 2 and 4).

66 (Fig. 1) is one of two exhaust pipes from the engine 2, each of which is situated within the engine housing and delivers into an exhaust extractor 67 projecting through the housing and comprising a funnel-shaped tube co-axial with and spaced from the exhaust pipe 66.

The housing of the engine 2 is ventilated and cooled, when the vehicle is on dry ground, by means of the exhaust extractors 67, 67, which induce an outward flow of air with the exhaust products, and which, however, tend to become sealed or partially so when the vehicle passes through water and to cause the exhaust gases to blow back into the housing and to set up sufficient pressure therein to keep out water, cooling not being necessary in these circumstances. Alternatively, a pressure pump may be provided to discharge into the engine housing when the vehicle is passing through water, or, in some cases the required pressure in the housing may be obtained from the normal discharge from the crankcase breather of the air and gasses passing the pistons.

68 is a blower, actuated by the engine 2, serving to supply air under pressure to the compartment 14, the air intake of said blower being connected by a pipe 69 with the tubular ported nearside trunnion 16 from which an intake pipe 70 passes along the compartment 14 and debouches at the forward end thereof (see Figs. 2 and 4) the delivery from said blower 68 being by means of a pipe 71 leading to the trunnion 16 and thence by a pipe 72 extending along the compartment 14 and terminating in a discharge nozzle 73 (see Fig. 2) in the vicinity of the occupant's face. In its passage to the discharge nozzle 73 the air is cleansed by being passed through a suitable filter or cleansing material enclosed in the adjacent hollow limb 15.

The space above each piston 20 in the cylinders 19, 19, is connected to the inlet manifold of the engine 2 by means of a pipe 74 fitted with a branch 75 to each cylinder 19, a control valve 76 being fitted at the junction of the two pipes (see Fig. 1).

In order to elevate the compartment 14, the occupant turns the control valve 76 so as to put the space above each piston 20 into communication, via the branches 75 and pipe 74, with the inlet manifold of the engine, thus creating a vacuum in each cylinder 19 above its piston 20 which, assisted by the corresponding spring 21, travels forwardly within the cylinder and, owing to the anchorage of its piston rod 22, constrains the cylinder and therefore also the compartment 14 to move angularly upwards.

In the case of fluid pressure control, in order to elevate the compartment 14, the occupant turns the control valve 76 so as to release pressure from the space above each piston 20, whereupon the springs 21 urge the pistons 20 forwardly within the cylinders 19 thereby elevating the compartment 14 which is depressed when necessary by manipulating the control valve 76 to re-admit fluid pressure to the pistons 20 forcing them downwardly and thus lowering the compartment 14.

77, Fig. 1, is one of a pair of shoulder abutments fitted within the compartment 14 in order to prevent the occupant thrusting himself forwardly when operating the pedal controls during such time as the compartment 14 is in a horizontal position.

As stated above, the vehicle may be constructed so that the compartment 14 may have angular movement about a vertical axis in addition to that about a horizontal axis already described, and to this end, as shown in Figures 5 and 6, the compartment 14, instead of being connected pivotally to the frames of the endless-track elements 1 may be pivoted at diametrically opposite points to a turret 78 which is mounted about a vertical axis on the endless-track framework and is connected either by worm or bevel gearing to a transmission member or members that is or are actuated through the engine clutch, or through additional clutch mechanism, by means of controls carried therefrom into the compartment 14 analogously to those controls already described.

For the purpose of adapting the vehicle for the transport of supplies or ammunition the frame of the carriage may be constructed with platforms or panniers, either permanently fixed thereto or mounted detachably thereon.

The maximum overall height of a machine constructed as described is approximately two feet from the ground level when the armoured compartment is in its lowermost position and consequently the machine not only possesses a low centre of gravity with resultant stability, but it can derive concealment with great facility from the minimum of natural or artificial cover and, moreover, it can be easily transported in numbers within larger and faster moving vehicles without its nature being observed. Furthermore, the ability to elevate the armoured compartment enables the occupant not only to obtain a field of fire from behind cover such as embankments, walls, or shallow trenches or pits, but also to engage in anti-aircraft defence.

What I claim is:

1. A mechanically propelled armoured vehicle having in combination, a carriage, a power unit for propelling the carriage, an elevatable compartment having spaced rearwardly extending hollow limbs at one end, transversely disposed tubular trunnions on opposite sides of the carriage, each of said limbs being pivotally connected to an adjacent trunnion and communicating therewith to provide a passage, and means communicating one of the tubular trunnions with the power unit for introducing air into the power unit.

2. A mechanically propelled armoured vehicle having in combination, a carriage, a power unit for propelling the carriage, an elevatable compartment having spaced rearwardly extending hollow limbs at one end, transversely disposed tubular trunnions on opposite sides of the carriage, each of said limbs being pivotally connected to an adjacent trunnion and communicating therewith to provide a passage, means communicating one of said tubular trunnions with said compartment, and a blower communicating with said last mentioned tubular trunnion for forcing air into said compartment.

3. A mechanically propelled armoured vehicle having in combination, a carriage, a power unit for propelling the carriage, an elevatable compartment having spaced rearwardly extending hollow limbs at one end, transversely disposed tubular trunnions on opposite sides of the carriage, each of said limbs being pivotally connected to an adjacent trunnion and communicating therewith to provide a passage, means communicating one of the tubular trunnions with the power unit for introducing air into the power unit, and a blower communicating with the other of said tubular trunnions for forcing air into said compartment.

4. In an endless-track armoured vehicle having a self-contained power unit for its propulsion, and housing a forwardly projecting firearm actuatable by a person accommodated in said vehicle in a prone position, a carriage, a relatively shallow enclosed body interfitting within said carriage, said body being articulated at its rear end to said carriage, means connecting said body to said carriage to elevate said body with respect thereto, a swivelling gun cupola mounted on the forward end of said body, and means carried by said cupola to maintain its angular position constant with respect to said carriage during the elevation of said body.

5. In an endless-track armoured vehicle having a self-contained power unit for its propulsion, and housing a forwardly projecting firearm actuatable by a person accommodated in said vehicle in a prone position, a carriage, a relatively shallow enclosed body normally fitting horizontally into said carriage, said body being articulated at its rear end to said carriage, means operable manually within said body to elevate and depress same angularly relatively to said carriage, said elevating and depressing means connecting said body to said carriage, a swivelling gun cupola mounted on the forward end of said body, and means carried by said cupola to maintain its angular position constant with respect to said carriage during the elevation and depression of said body.

6. In an endless-track armoured vehicle having a self-contained power unit for its propulsion, and housing a forwardly projecting firearm actuatable by a person accommodated in said vehicle in a prone position, a carriage, a relatively shallow enclosed body normally fitting horizontally into said carriage, said body being articulated at its rear end to said carriage, means operable manually within said body to elevate and depress same angularly relatively to said carriage, said elevating and depressing means connecting said body to said carriage, means to traverse said body with respect to said carriage when elevated, a swivelling gun cupola mounted on the forward end of said body, and means carried by said cupola to maintain its angular position constant with respect to said carriage during the elevation and depression of said body.

7. In an endless-track armoured vehicle having a self-contained power unit for its propulsion, and housing a forwardly projecting firearm actuatable by a person accommodated in said vehicle in a prone position, a carriage, a relatively shallow enclosed body normally fitting horizontally into said carriage, said body being articulated at its rear end to said carriage, manually operable vacuum-servo elevating gear within said body to move same angularly with respect to said carriage, said vacuum-servo elevating gear connecting said body to said carriage, means within said body to traverse same with respect to said carriage, a swivelling gun cupola mounted on the forward end of said body, and means carried by said cupola to maintain its angular position constant with respect to said carriage during the elevation and depression of said body.

8. In an endless-track armoured vehicle having a self-contained power unit for its propulsion, and housing a forwardly projecting firearm actuatable by a person accommodated in said vehicle in a prone position, a carriage, a relatively shallow enclosed body normally fitting horizontally into said carriage, said body being articulated at its rear end to said carriage, manually operable fluid pressure elevating gear within said body to move same angularly with respect to said carriage, said fluid pressure elevating gear connecting said body to said carriage, means within said body to traverse same with respect to said carriage, a swivelling gun cupola mounted on the forward end of said body, and means carried by said cupola to maintain its angular position constant with respect to said carriage during the elevation and depression of said body.

9. In an endless-track armoured vehicle having a self-contained propelling unit and housing a forwardly projecting firearm actuatable by a person accommodated in said vehicle in a prone position, a carriage, a relatively shallow body constituting an enclosed firing compartment normally fitting horizontally within said carriage, said compartment having rearwardly extending limbs articulated to said carriage, means connecting said compartment to said carriage and serving to elevate said compartment angularly with respect thereto to obtain the desired field of fire, a swivelling gun cupola mounted on the forward end of said compartment and housing said fire arm traversably within said cupola, and means carried by said cupola to maintain its angular position constant with respect to said carriage for all angles of elevation of said compartment.

10. A mechanically propelled armoured vehicle having in combination, a carriage, a power unit for propelling the carriage, an elevatable compartment having spaced rearwardly extending hollow limbs at one end, transversely disposed tubular trunnions on opposite sides of the carriage, each of said limbs being pivotally connected to an adjacent trunnion and communicating therewith to provide a passage, means communicating one of the tubular trunnions with the power unit for introducing air into the power unit, a blower communicating with the other of said tubular trunnions for forcing air into said compartment, means within the compartment operably connected to the power unit for elevating and depressing the compartment, and means for moving the compartment on a vertical axis.

ERNEST THOMAS JAMES TAPP.